United States Patent
Boult et al.

(10) Patent No.: US 11,295,240 B2
(45) Date of Patent: Apr. 5, 2022

(54) SYSTEMS AND METHODS FOR MACHINE CLASSIFICATION AND LEARNING THAT IS ROBUST TO UNKNOWN INPUTS

(71) Applicant: Terrance E Boult, Colorado Springs, CO (US)

(72) Inventors: Terrance E E Boult, Colorado Springs, CO (US); Akshay Raj Dhamija, Delhi (IN); Manuel Günther, Wachstedt (DE)

(*) Notice: Subject to any disclaimer, the term of this patent is extended or adjusted under 35 U.S.C. 154(b) by 482 days.

(21) Appl. No.: 16/442,469

(22) Filed: Jun. 15, 2019

(65) Prior Publication Data
US 2020/0394557 A1  Dec. 17, 2020

(51) Int. Cl.
G06N 20/00 (2019.01)
G06F 16/28 (2019.01)

(52) U.S. Cl.
CPC .......... G06N 20/00 (2019.01); G06F 16/285 (2019.01)

(58) Field of Classification Search
CPC .............................. G06N 20/00; G06F 16/285
See application file for complete search history.

(56) References Cited

U.S. PATENT DOCUMENTS

| | | | | |
|---|---|---|---|---|
| 6,690,829 B1* | 2/2004 | Kressel | ............... | G06K 9/00818 382/156 |
| 9,792,532 B2* | 10/2017 | Cox | ....................... | G06K 9/627 |
| 9,811,905 B2* | 11/2017 | Alpert | ................... | G06K 9/4671 |
| 10,354,199 B2* | 7/2019 | Clinchant | ............ | G06N 3/0454 |
| 10,373,073 B2* | 8/2019 | Kisilev | .................. | G06N 20/00 |
| 2020/0202181 A1* | 6/2020 | Yadav | .................. | G06K 9/6281 |

OTHER PUBLICATIONS

Fernandez 2018, Springer, pp. 200-206.*

* cited by examiner

*Primary Examiner* — David J Stoltenberg
*Assistant Examiner* — Michael I Ezewoko (57) ABSTRACT

The invention includes systems and methods, including computer programs encoded on computer storage media, for classifying inputs as belonging to a known or unknown class as well as for updating the system to improve is performance. In one system, there is a desired feature representation for unknown inputs, e.g., a zero vector, and the system includes transforming input data to produce a feature representation, using that to compute dissimilarity with the desired feature representation for unknown inputs and combining dissimilarity with other transformations of the feature representation to determine if the input is from a specific known class or if it is unknown. In one embodiment, the system transforms the magnitude of the feature representation into a confidence score. In an update method to improve performance, the system transforms inputs into feature representations which go through a scoring means and then use a robust loss function, which has different loss terms for known and unknown inputs which are then used to update the system weights to improve performance.

19 Claims, 6 Drawing Sheets

SYSTEMS AND METHODS FOR MACHINE CLASSIFICATION AND LEARNING THAT IS ROBUST TO UNKNOWN INPUTS

CROSS-REFERENCE TO RELATED APPLICATION

This application claims the benefit of U.S. Provisional Patent Application Ser. No. 62/685,963, entitled "Systems and methods for network learning robust to unknown inputs," filed Jun. 16, 2018, the contents of which are incorporated herein by reference.

FIELD OF THE INVENTION

Embodiments of the present invention relate to systems and methods for classification, including learning of representations for use in classification systems from data, where the classification systems are robust to unknown inputs. More particularly, embodiments related to systems and methods where inputs from unknown classes of data are represented in such a manner that the system has improved the separation between inputs from multiple known and from unknown classes, and also address methods for improving such separation by machine learning using a class of robust loss functions. In other words, the invention improves on the multi-class recognition systems by providing robustness to data from inputs that come from classes other than that which they were designed to handle or from which they were trained.

BACKGROUND OF THE INVENTION

There are many systems designed to detect or recognize a wide range of objects. Such systems are developed around a set of classes of interest. However, when used in a general setting, there is a significant probability that such systems will have to process data from other unknown classes, e.g., a visual recognition system may see new objects, a system analyzing human behavior will see novel behaviors, a medical diagnostic system is presented with new diseases, and a security system will see new attacks. In a system that detects or recognizes objects, the ability to robustly handle such unknown data is critical. This invention addresses how to improve the ability to detect or recognize correct classes while reducing the impact of unknown inputs.

In order to formalize the discussion and better understand the problem, let us assume $\mathcal{Y} \subset \mathbb{N}$ be the infinite label space of all classes which can be broadly categorized into:

$\mathcal{C} = \{1, \ldots, C\} \subset \mathcal{Y}$: The known classes of interest, which the system shall identify.

$\mathcal{U} = \mathcal{Y} - \mathcal{C}$: The unknown classes. This set contains all types of classes the system needs to reject. Since $\mathcal{Y}$ is infinite and $\mathcal{C}$ is finite, $\mathcal{U}$ is also infinite. This set can further be divided:

$\mathcal{B} \subset \mathcal{U}$: The background, garbage, or known unknown classes. Since $\mathcal{U}$ is infinitely large, during training only a small subset can be used, which is represented by $\mathcal{B}$.

$\mathcal{A} = \mathcal{U} - \mathcal{B} = \mathcal{Y} - \mathcal{C} - \mathcal{B}$: The unknown classes. This subset represents the rest of the infinite space $\mathcal{U}$, samples from which are never available during training but only occur during testing.

Let the samples seen during system design or training belonging to $\mathcal{B}$ be depicted as $\mathcal{D}_b'$ and the ones seen during testing or operation depicted as $\mathcal{D}_b$. Similarly, the samples seen during testing/operation belonging to $\mathcal{A}$ are represented as $\mathcal{D}_a$. The samples belonging to the known classes of interest $\mathcal{C}$, seen during training and testing/operation are represented as $\mathcal{D}_c'$ and $\mathcal{D}_c$, respectively. Finally, the unknown samples see during operation/testing are called $\mathcal{D}_u = \mathcal{D}_b \cup \mathcal{D}_a$.

Classification and recognition systems have a long history with many inventions. Ever since a convolutional neural network (CNN) won the ImageNet Large Scale Visual Recognition Challenge (ILSVRC), the extraordinary increase in the performance of deep learning architectures has contributed to the growing application. Interestingly, though each year new state-of-the-art-algorithms emerge from each of these domains, a crucial component of their architecture remains unchanged—handling unwanted or unknown inputs.

For traditional learning systems, learning with rejection or background classes have been around for decades, for example, see Chi-Keung Chow: "An optimum character recognition system using decision functions." IRE Transactions on Electronic Computers, (4):247-254, 1957, and C. K. Chow: "On optimum recognition error and reject tradeoff," IEEE Transactions on Information Theory, IT-16, no. 1, pp. 41-46, 1970. These works and the many extensions to it assume we have exact knowledge of the class statistics and/or probability distributions.

More recent inventions have expanded on these ideas. For example, U.S. Pat. No. 6,438,519, issued Aug. 20, 2002, to William Michael Campbell and Charles Conway Broun entitled "Apparatus and method for rejecting out-of-class inputs for pattern classification." The #519 patent teaches of an approach that is simple thresholding of ranking of classification score, a slight variation of the original Chow approach of thresholding score. The threshold is determined from a ranking tolerance. The approach presumes the feature representation, and the classifiers are both fixed, and the patent teaches only how to select among outputs.

The formulation of U.S. Pat. No. 6,690,829, issued Feb. 10, 2004, to Ulrich Kressel, Frank Lindner, and Christian Wohler entitled "Classification system with reject class." offers a more general model where they include items from both known inputs $\mathcal{D}_c'$ and undesired inputs $\mathcal{D}_b'$. They try to also reject unknowns from other classes, using a rejection threshold that is determined using the inputs from $\mathcal{D}_c'$ and $\mathcal{D}_b'$. The approach presumes the feature representation, and the classifiers are both fixed. The patent teaches only how to select a threshold on classification scores to reject unknown inputs from $\mathcal{D}_u$.

More recently, U.S. Patent US10133988B2 issued 2018 Nov. 20 to Pedro Ribeiro Mendes Júnior, et al. entitled "Method for multiclass classification in open-set scenarios and uses thereof." address the problem of rejection of unknown inputs in multiclass classification. That patent teaches of using optimization of parameters using samples a combination of samples $\mathcal{D}_c'$ and $\mathcal{D}_b'$ to determine an optimal ratio threshold, and then using ratios of similarity scores between the input and two different classes. The approach presumes the feature representation, and the classifiers are both fixed. The patent teaches only how to select the threshold for the ratio of scores, which is used to classify an input as being from an unknown class.

Recent advances in classification use deep networks and machine learning to determine better features for classification, e.g., U.S. Pat. No. 9,730,643, issued Aug. 15, 2017, to Bogdan Georgescu, Yefeng Zheng, Hien Nguyen, Vivek Kumar Singh, Dorin Comaniciu, and David Liu entitled "Method and system for anatomical object detection using marginal space deep neural networks." and U.S. Pat. No.

9,965,717, issued May 8, 2018, to Zhaowen Wang, Xianming Liu, Hailin Jin, and Chen Fang entitled "Learning image representation by distilling from multi-task networks." Neither has an effective approach to address unknown inputs.

Training deep networks with standard loss functions produce representations that separate the known classes well. However, because they were not designed to transform unknown inputs to any particular location, they will generally transform into features that overlap with known classes, see FIG. 1. The network in FIG. 1(a) was only trained to classify the 10 digits in the MNIST classes while the networks in FIG. 1(b) and FIG. 1(c) added MNIST letters as background examples (known unknowns). In the feature representation plots, the numbers represent $\mathcal{D}_c$, i.e., test samples from the ten MNIST classes, while black dots represent samples from the Devanagari dataset ($\mathcal{D}_a$). Clearly, the network is not robust to unknown inputs. The dashed lines indicate class borders, i.e., where softmax scores for neighboring classes are equal. This invention addresses how to improve recognition by reducing the overlap of network features from known samples $\mathcal{D}_c$ with features from the background or unknown samples $\mathcal{D}_u$, and produces a much better separation as see in FIG. 1(c) and FIG. 1(d).

The #829 patent above was an example of an ad-hoc approach for addressing unknown inputs with traditional features by adding an additional background or garbage class explicitly trained on data from $\mathcal{D}_b'$ to represent that as just another class in the system, and then to consider unknowns as anything close to the background class. Such an approach can also be used with deep networks to learn features that better separate the background class from the known classes. For example, US Patent US10289910B1 issued May 14, 2019, to Chen et al. entitled "System and method for performing real-time video object recognition utilizing convolutional neural networks" includes training a background class to improve system robustness. While an ad-hoc approach of training background class can improve robustness, there are infinitely many potential unknowns, and the background class cannot sample them well. Furthermore, when treated as a normal class, the background class can only be adjacent to a small number of the known classes. Therefore, unknown inputs that are more similar to the non-adjacent classes cannot easily map to the background class. Thus when unknown inputs are presented to the system, they will still frequently overlap with the known classes, see FIG. 1(b). While the training with background class improves rejection of unknown inputs a bit, there are still a very large number of errors.

Techniques have been developed that more formally address the rejection of samples $x \in \mathcal{D}_u$, for example, see Abhijit Bendale and Terrance E. Boult: "Towards open set deep networks." In Proceedings of the IEEE Conference on Computer Vision and Pattern Recognition, pp. 1563-1572. 2016, referred to herein as OpenMax. However, that just uses the deep features of known classes, has no representation of unknown inputs and has no way to improve the robustness to unknowns. If the deep features overlap, as in see FIG. 1, then the OpenMax approach cannot separate unknown from known inputs.

One of the limitations with the background class is that it requires the features of all unknown samples to be in one region of feature space, independent of the similarity of that class to the known classes. An important question not addressed in prior work is if there exists a better and simpler representation, especially one that is more effective for low false accept performance for unknown inputs.

What is needed is a multi-class recognition system that can explicitly reason about unknown inputs, and that improves its performance when given more examples of classes that are not of interest. The things that are needed will be put forth as solutions in the next section.

OBJECTS OF THE INVENTION

It is an object of this invention to develop a multi-class classification system that is robust to unknown inputs, and that can improve its performance using added examples.

Still other objects and advantages of the invention will in part be obvious and will in part be apparent from the specification and drawings.

SUMMARY OF THE INVENTION

In order to overcome the problem of unknown inputs, the invention develops a classification system that uses an explicit representation of unknown classes, which can be near all known classes in input space, and develops a method of training such classification system so as to learn feature representations that send most unknowns near the desired explicit representation while keeping known classes farther away from that representation.

The invention accordingly includes training with a mixture of known data ($x \in \mathcal{D}_c'$) and known unknown data ($x \in \mathcal{D}_b'$) using a robust loss function that treats known inputs and unknown inputs separately, such that reducing the robust loss will drive the system to learn to transform known inputs to representations separate from other classes and learn to transform the unknown samples to a desired representation, e.g. the origin or the average of the representation of known classes. The classification system can use the learned transformations and representations to compute the similarity to known classes and dissimilarity to the desired location for unknown classes. The robust classification system can be implemented as a set of instructions stored in a non-transitory computer storage medium and executed on one or more general purpose or specialized processors.

The apparatus embodying features of multiple embodiments, combinations of elements and arrangement of parts that are adapted to effect such steps, are exemplified in the following detailed disclosure, and the scope of the invention will be indicated in the claims. While there are many potential embodiments, we begin with a description of the preferred embodiments using deep networks which provide the current state of the art in many classification problems. While the invention is far more general, we discuss it from the deep network point of view to provide a more coherent presentation, then discuss alternative embodiments afterwards.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
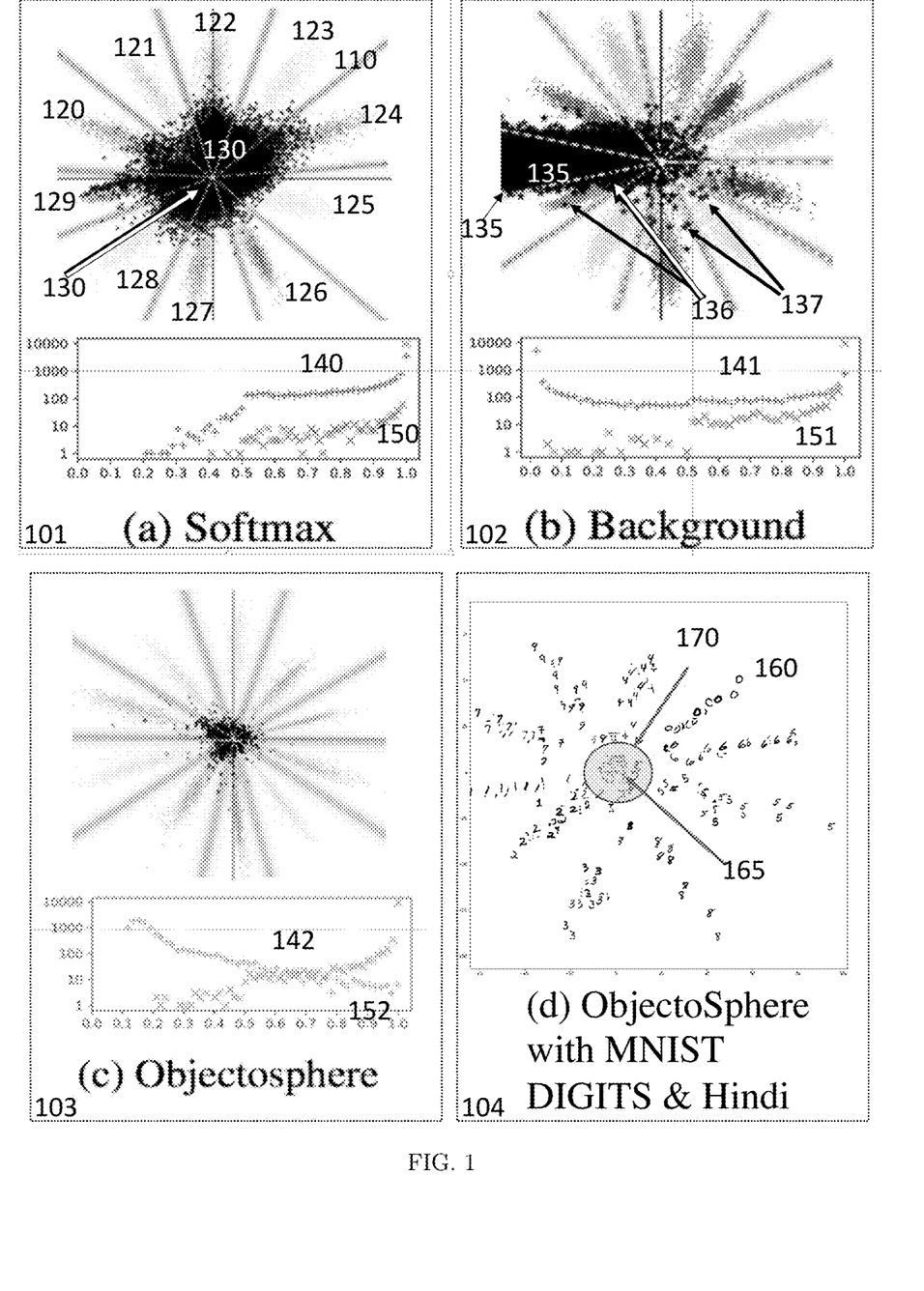
FIG. 1 Example showing different types of network performance on known and unknown data.

As mentioned, some of the inherent problems with using a traditional network is shown in FIG. 1. In FIG. 1(a) we see the results with a standard softmax network applied to learning the digits 0-9 where the different classes 120, 121, 122, 123, 124, 125, 126, 127, 128, 129 show as dots in different shades of gray. They are well separated from each other by the softmax boundaries (shown in gray with white dashed line) as in 110. Unfortunately unknown inputs from non-digit classes, shown as black stars 130, overlap the digits are confidently predicted as known inputs. The plot at the bottom of FIG. 1(a) shows frequency in the vertical axis of versus the confidence in the horizontal axis with + for unknown inputs 140 and × for known inputs 150. There is no threshold on confidence that meaningfully separates the knowns and unknowns.

In FIG. 1(b) we see a similar plot for a network trained with the 10 digit classes but using letters for the background class. One of the inherent problems with using a traditional background class is that said class can only be near a few of the known classes; thus if an unknown input is more like one of the known classes not near the background, it is not possible for it to be classified as background. For example in FIG. 1(b) while many of the unknown inputs (black stars) are capture by the background classes 135, There are still many unknown inputs that overlap other classes, e.g. 136. For the adjacent classes like 136, there is a lot of overlap while the non-adjacent classes, have fewer 137, but that may be because the points average their behavior and so move from the non-adjacent classes toward the adjacent ones. Again looking at the frequency plot at the bottom there is no threshold for confidence that separates + for unknown inputs 141 from × for known inputs 151, but it is better than pure softmax since there are many unknowns + with near very low confidence so thresholding does reject many of them.

However, in one embodiment of the present invention, we intentionally train the network to respond only to known inputs in a spatial region that reaches to the origin and to transform known unknown inputs to the origin, see FIG. 1(c) and FIG. 1(d) for a 2D example. Therefore, each known class is adjacent to the desired location (the origin) for unknown inputs, alleviating the problem of mixing of representations—the representation can be in the direction of the known classes but just with smaller magnitude. Looking at the frequency plot at the bottom of FIG. 1(c) we can see that most of the unknowns inputs 142 now have low confidence, and a threshold around 0.7 does a good job of separating + for unknown inputs 142 from × for known inputs 152. Note the vertical axis is exponential. In FIG. 1(d) we plot the first 2000 samples of known digits and unknown Hindi inputs 165, and see the actual samples plotted with the digits 160 well separated from the unknowns 170 with the former all outside a circle 170 while the latter are all within it.

While one cannot anticipate all unknown unknowns, the many embodiments of the present invention have the advantage that since unknown samples should provide little to no response, the network is being trained to only respond to known inputs, increasing the probability that when an unknown from $\mathcal{D}_u$ is encountered the system will not respond.

We now develop the underlying theory for two embodiments, where for $x \in \mathcal{D}_b'$ we maximize the entropy of the softmax scores and reduce the deep feature magnitude ($\|F(x)\|$), separating them from the known samples. This allows the network to have unknowns that share features with known classes as long as the response is small and may allow the network to focus learning capacity to respond to the known classes. We do this using two embodiments of a robust loss function, which can be used separately or combined. After reviewing the mathematical derivations of the robust loss function, we return to describing systems that can use these robust loss functions to develop classifiers that are robust to unknown inputs.

First, we introduce the Entropic Open-Set Loss to make the softmax responses of unknown samples uniform. Second, we expand this loss into the Objectosphere Loss, which requires the samples of $\mathcal{D}_c'$ to have a magnitude above a specified minimum while driving the magnitude of the features of samples from $\mathcal{D}_b'$ to zero, providing a margin in both magnitude and entropy between known and unknown samples.

In the following, for classes $c \in \{1, \ldots, C\}$ let $S_c(x)$ be the standard softmax score for class c with $$S_c(x) = \frac{e^{l_c(x)}}{\sum_{c'} e^{l_{c'}(x)}},$$

where $l_c(x)$ represents the log it value for class c. Let $F(x)$ be deep feature representation from the fully connected layer that feeds into the log its. For brevity, we do not show the dependency on input x when it is obvious.

Entropic Open-Set Loss

In deep networks, the most commonly used loss function is the standard softmax loss given above. While we keep the softmax loss calculation untouched for samples of $\mathcal{D}_c{}'$, we modify it for training with the samples from $\mathcal{D}_b{}'$ seeking to equalize their log it values $l_c$, which will result in equal softmax scores $S_c$. The intuition here is that if an input is unknown, we know nothing about what classes it relates to or what features we want it to have and, hence, we want the maximum entropy distribution of uniform probabilities over the known classes. Let $S_c$ be the softmax score as above, our Entropic Open-Set Loss $J_E$ is defined as:

$$J_E(x) \begin{cases} -\log S_c(x) & \text{if } x \in \mathcal{D}_c' \text{ is from class } c \\ -\frac{1}{C}\sum_{c=1}^{C}\log S_c(x) & \text{if } x \in \mathcal{D}_b' \end{cases} \quad (1)$$

We now show that the minimum of the loss $J_E$ for sample $x \in \mathcal{D}_b$ is achieved when the softmax scores $S_c(x)$ for all known classes are identical.

For an input $x \in D_b$, loss $J_E(x)$ is minimized when all softmax responses $S_c(x)$ are equal: $\forall c \in \{1, \ldots, C\}$:

$$S_c(x) = S = \frac{1}{C}.$$

For $x \in \mathcal{D}_b{}'$ the loss $J_E(x)$ is similar in form to entropy over the per-class softmax scores. Thus, based on Shannon's entropy theory, it should be intuitive that the term is minimized when all values are equal. $J_E(x)$ is not exactly entropy.

When the logit values are equal, the loss $J_E(x)$ is minimized. The follows since if the log its are equal, say $l_c = \eta$, then each softmax has an equivalent numerator ($e^\eta$) and, hence, all softmax scores are equal.

While the above analysis shows that the system minimizes the loss and maximizes entropy, this minimization is at the layer of the log its in the system. One may be interested in the behavior at deeper levels of the nets. For networks whose log it layer does not have bias terms, and for $x \in \mathcal{D}_b{}'$, the loss $J_E(x)$ is minimized when the deep feature that feeds into the log its is the zero vector, at which point the softmax responses $S_c(x)$ are equal: $\forall c \in \{1, \ldots, C\}$:

$$S_c(x) = S = \frac{1}{C}$$

and the softmax and deep feature entropy is maximized. To see this let $F \in \mathbb{R}^M$ be our deep feature vector, and $W_c \in \mathbb{R}^M$ be the weights in the layer that connects F to the log it $l_c$. Since the network does not have bias terms, $l_c = W_c \cdot F$, so when $F = \vec{0}$, then the logits are all equal to zero: $\forall c: l_c = 0$. As we saw above, we have when the logits are all equal the loss $J_E(x)$ is minimized, and softmax scores are equal and maximize entropy.

While we show that at least one minimum exists when the deep feature at the layer satisfy $F = \vec{0}$, the analysis does not show that $F = \vec{0}$ is the only minimum because it is possible there is a subspace of the feature space that is orthogonal to all $W_c$. Minimizing loss $J_E(x)$ may, but does not have to, result in a small magnitude on unknown inputs.

In FIG. 1(a) the magnitude of the unknown samples are generally lower than the magnitudes of the known samples for a typical deep network. This shows that that deep networks trained using the above loss function actually know what they do not know. Using our novel Entropic Open-Set loss, we are able to decrease the magnitudes of unknown samples further. For this particular example, using the embodiment with our Objectosphere loss (FIG. 1(c) & FIG. 1(d)) we are able to create an even better separation between known (160) and unknown samples (165).

Objectosphere Loss

Following the above analysis, the Entropic Open-Set loss produces a network that generally represents the unknown samples with very low magnitudes, which can be seen in ??, while also producing high softmax entropy. However, there is often some overlap between the feature magnitudes of known $\mathcal{D}_c$ and unknown samples $\mathcal{D}_u$. This should not be surprising as nothing is forcing known samples to have a large feature magnitude or always force unknown samples to have small feature magnitude. Seeking a network with large response to known and no response to unknown inputs, we attempt to put a distance margin between them. In particular, we seek to push known samples into what we call the Objectosphere, where they have large feature magnitude and low entropy—we are training the network to have a large response to known classes. Also, we penalize $\|F(x)\|$ for $x \in \mathcal{D}_b{}'$, to minimize feature-length and maximize entropy, with the goal of producing a network that does not highly respond to anything other than the class samples. Targeting the deep feature layer helps ensure there are no accidental minima. To formalize this, the Objectosphere loss is calculated as:

$$J_R = J_E + \lambda \begin{cases} \max(\xi - \|F(x)\|, 0)^2 & \text{if } x \in \mathcal{D}_c' \\ \|F(x)\|^2 & \text{if } x \in \mathcal{D}_b' \end{cases} \quad (2)$$

Note this penalizes the known classes if their feature magnitude is inside the boundary of the Objectosphere, and penalizes unknown classes if their magnitude is greater than zero. We now show this has only one minimum.

For networks whose log it layer does not have bias terms, given an known unknown input x, loss $J_R(x)$ is minimized if and only if the deep feature $F = \vec{0}$ which in turn ensures the softmax responses $S_c(x)$ are equal: $\forall c \in \{1, \ldots, C\}$:

$$S_c(x) = S = \frac{1}{C},$$

maximizing entropy. The "if" follows directly from the analysis above combined with the fact that adding 0 does not change the minimum and given $F = \vec{0}$, the logits are zero, and the softmax scores must be equal. For the only if, observe that of all features with $(W_c \cdot F) = 0$, $c = 1 \ldots C$ that minimize $J_E$, the added $\|F(x)\|^2$ ensures that the only minimum is at $F = \vec{0}$.

The parameter ξ sets the margin, but also implicitly increases scaling and can impact learning rate; in practice, one can determine e using cross-class validation. Note that larger ξ values will generally scale up deep features, including the unknown samples, but what matters is the overall separation. As seen in the histogram plots of ??, the Objectosphere loss provides an improved separation in feature magnitudes, as compared to the Entropic Open-Set Loss.

Finally, in yet another embodiment we can combine the magnitude with a per-class score from softmax and use the number of feature dimensions to help decide when do so. For low dimensional problems after training with the Objectosphere loss, we have already trained to send unknowns to the origin where they have nearly identical scores, and so we can report/threshold just the final softmax $S_c(x)$. When the feature dimension is large, we use what we called Scaled-Objectosphere scoring, $S_c(x) \cdot \|F(x)\|$, i.e. we can explicitly scale by the deep feature magnitude. Experimental evaluations show that Scaled-Objectosphere is about the same on small problems but better for large dimensional feature representations.

Experimental Evaluation

To highlight the usefulness of the present inventions, we evaluate various embodiments that are build using deep networks and compare them to standard methods. For evaluation, we split the test samples into $\mathcal{D}_c$ (samples from known classes) and $\mathcal{D}_a$ (samples from unknown classes). Let θ be a probability threshold. For samples from $\mathcal{D}_c$, we calculate the Correct Classification Rate (CCR) as the fraction of the samples where the correct class c* has maximum probability and has a probability greater than θ. We compute the False Positive Rate (FPR) as the fraction of samples from $\mathcal{D}_a$ that are classified as any known class c=1, . . . , C with a probability greater than θ.

$$FPR(\theta) = \frac{|\{x \mid x \in \mathcal{D}_a \wedge \max_c P(c \mid x) \geq \theta\}|}{|\mathcal{D}_a|}, \quad (3)$$

$$CCR(\theta) = \frac{|\{x \mid x \in \mathcal{D}_c \wedge \operatorname{argmax}_c P(c \mid x) = c^* \wedge P(c^* \mid x) > \theta\}|}{|\mathcal{D}_c|}.$$

Finally, we plot CCR versus FPR, varying the probability threshold from θ=1 on the left side to θ=0 on the right side. For θ=0, the CCR is identical to the closed-set classification accuracy. When the classification is performed in combination with detectors that produce different numbers of background samples, the normalization of FPR with an algorithm specific $\mathcal{D}_a$ might be misleading, and it is better to use the raw number of false positives on the x-axis.

The first experimental setup, uses LeNet++ (Yandong Wen et al.: "A discriminative feature learning approach for deep face recognition." European Conference on Computer Vision. Springer, Cham, 2016.) on the MNIST Dataset (Yann LeCun: "The MNIST database of handwritten digits." http://yann.lecun.com/exdb/mnist (1998)) which was also used in FIG. 1.

The new algorithms significantly outperform the recent state of the art OpenMax. In Tab. 1, we show that as designed, the new algorithms do increase entropy and decrease magnitude for unknown inputs. We also tested that same trained network with different sets of unknowns $\mathcal{D}_u$, including letters from the Devanagari script and unrelated images from CIFAR-10. We summarize the corresponding Correct Classification Rates (CCR) at various False Positive Rates (FPR) values in Tab. 2. In each case, one of the new approaches is the best, and in the 2D examples, there is not a significant difference between the two approaches in a 2D feature space.

TABLE 1

Entropy and Distance Measures for Known and Unknown test samples for different algorithms on Experiment #1. As predicted by the theory, ObjectoSphere has the highest entropy for unknowns and greatest separation and between known and unknown for both entropy and deep feature magnitude.

| Algorithm | Known Entropy | Unknown Entropy | Known Magnitude | Unknown Magnitude |
| --- | --- | --- | --- | --- |
| SoftMax | 0.015 ± .084 | 0.318 ± .312 | 94.90 ± 27.47 | 32.27 ± 18.47 |
| Entropic OpenSet | 0.050 ± .159 | 1.984 ± .394 | 50.14 ± 17.36 | 1.50 ± 2.50 |
| ObjectoSphere | 0.056 ± .168 | 2.031 ± .432 | 76.80 ± 28.55 | 2.19 ± 4.73 |

Our second set of experiments show that our loss is also applicable to other architectures. We created a custom protocol using the CIFAR-10 and CIFAR-100 datasets. We train a ResNet 18 architecture to classify the ten classes from CIFAR-10, i.e., CIFAR-10 are our known samples $\mathcal{D}_c$. Our background class $\mathcal{D}_b{}'$ consists of all the samples from CIFAR-100 that contain any of the vehicle classes. We use 4500 samples from remaining of the CIFAR-100 as $\mathcal{D}_a$, i.e., the unknown samples. We also test using 26032 samples of Street View House Numbers (SVHN) (Yuval Netzer et al.: "The Street View House Numbers (SVHN) Dataset." Accessed 2016 Oct. 1. [Online] http://ufldl.stanford.edu/housenumbers.) as $\mathcal{D}_a$. With the 1024 feature dimension of ResNet, the scaling by feature magnitude provides a noticeable improvement. This highlights the importance of minimizing the deep feature magnitude and using the magnitude margin for separation. The results are also shown in Tab. 2, and while using background class does better than Entropic Openset and ObjectoSphere at very low FAR, the Scaled-Objectosphere is the best.

TABLE 2

Correct Classification Rates (CCR) at different False Positive Rates (FPR) for multiple algorithms tested on different datasets. For each experiment at each FAR rate, the best performance is in bold. We show Scaled-Objectosphere only when it was better than ObjectoSphere; magnitude scaling does not help in the 2D feature space of LeNet++.

| Experiment | Unknowns $|\mathcal{D}_a|$ | Algorithm | CCR at FAR of $10^{-4}$ | $10^{-3}$ | $10^{-2}$ | $10^{-1}$ |
|---|---|---|---|---|---|---|
| LeNet++ Architecture Trained with MNIST digits as $\mathcal{D}_c$ and NIST Letters as $\mathcal{D}_b$ | Devanagri 10032 | SoftMax | 0.0 | 0.0 | 0.0777 | 0.9007 |
| | | Background | 0.0 | 0.4402 | 0.7527 | 0.9313 |
| | | Entropic Openset | 0.7142 | 0.8746 | 0.9580 | 0.9788 |
| | | ObjectoSphere | 0.7350 | 0.9108 | 0.9658 | 0.9791 |
| | NotMNIST 18724 | SoftMax | 0.0 | 0.3397 | 0.4954 | 0.8288 |
| | | Background | 0.3806 | 0.7179 | 0.9068 | 0.9624 |
| | | Entropic Openset | 0.4201 | 0.8578 | 0.9515 | 0.9780 |
| | | ObjectoSphere | 0.512 | 0.8965 | 0.9563 | 0.9773 |
| | CIFAR10 10000 | SoftMax | 0.7684 | 0.8617 | 0.9288 | 0.9641 |
| | | Background | 0.8232 | 0.9546 | 0.9726 | 0.973 |
| | | Entropic Openset | 0.973 | 0.9787 | 0.9804 | 0.9806 |
| | | ObjectoSphere | 0.9656 | 0.9735 | 0.9785 | 0.9794 |
| ResNet-18 Architecture Trained with CIFAR-10 Classes as $\mathcal{D}_c$ and Subset of CIFAR-100 as $\mathcal{D}_b$ | SVHN 26032 | SoftMax | 0.1924 | 0.2949 | 0.4599 | 0.6473 |
| | | Background | 0.2012 | 0.3022 | 0.4803 | 0.6981 |
| | | Entropic Openset | 0.1071 | 0.2338 | 0.4277 | 0.6214 |
| | | ObjectoSphere | 0.1862 | 0.3387 | 0.5074 | 0.6886 |
| | | Scaled-Objecto | 0.2547 | 0.3896 | 0.5454 | 0.7013 |
| | CIFAR-100 Subset 4500 | SoftMax | N/A | 0.0706 | 0.2339 | 0.5139 |
| | | Background | N/A | 0.1598 | 0.3429 | 0.6049 |
| | | Entropic Openset | N/A | 0.1776 | 0.3501 | 0.5855 |
| | | ObjectoSphere | N/A | 0.1866 | 0.3595 | 0.6345 |
| | | Scaled-Objecto | N/A | 0.2584 | 0.4334 | 0.6647 |

Preferred and Alternative Embodiments

The present invention can be viewed as a system for robust transformation of input data into classes, i.e., robust classification. It can also be viewed as a method of transforming a classification system so as to improve its robustness to unknown inputs. We describe embodiments of both views.

Figure 2:
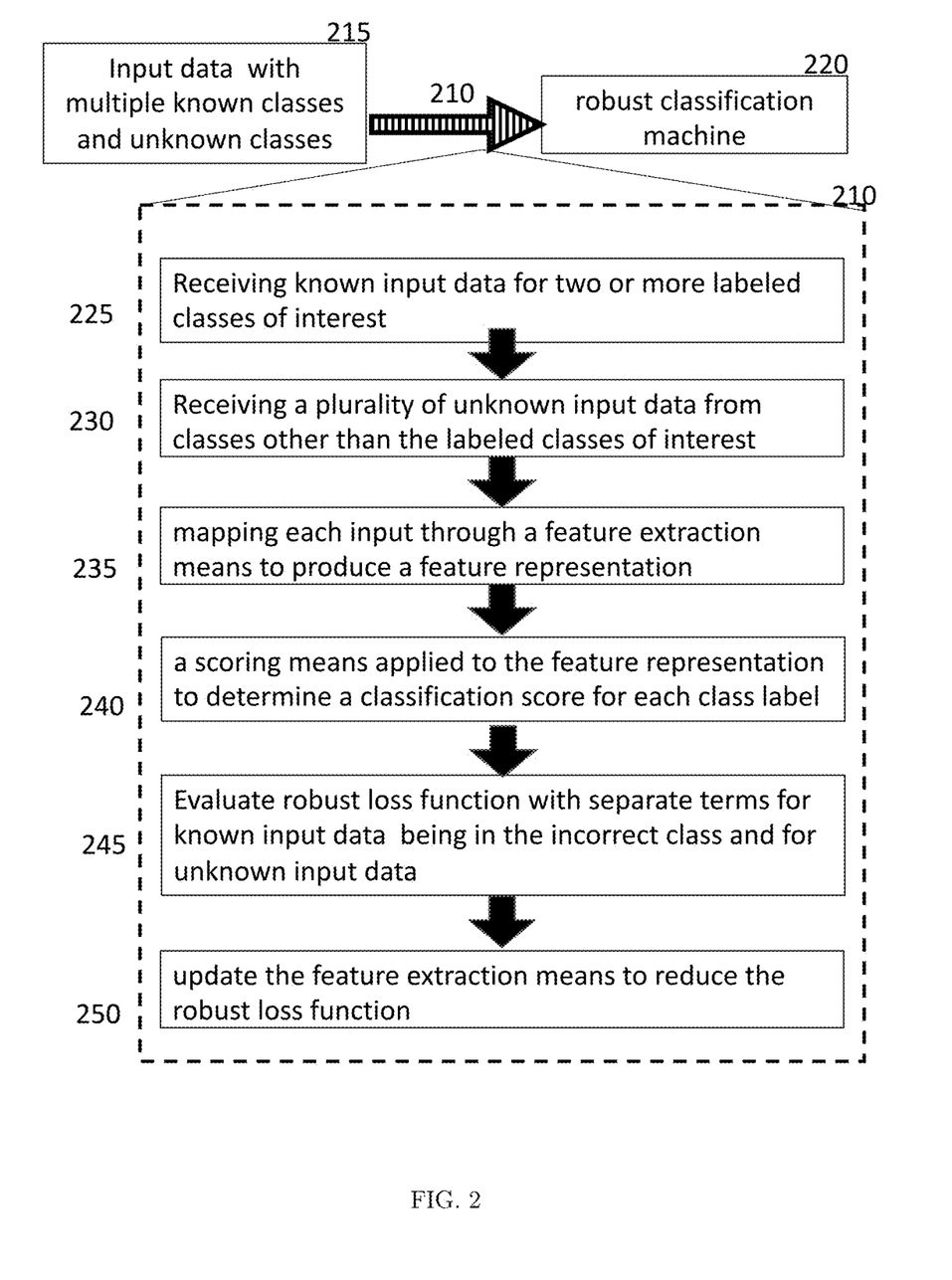
FIG. 2 Overall method of transformation from input data to robust classifier.

The preferred embodiment of the method of transforming a classification system so as to improve its robustness to unknown inputs is summarized in FIG. 2. The transformation method 210 takes input data from multiple known classes and unknown classes 215 and uses that to output a robust classification machine, or to improve the robustness of an existing machine. The transformation method 210 includes the steps of receiving a multi-class known input data 225 as well as receiving unknown input data from classes other than the labeled classes of interest 230, transforming each input through a feature extraction means to produce a feature representation for each input 235, then applying a scoring means to each feature representation to determine a classification score for each class label 240, using the feature representation and input labels to evaluate a robust loss function that separately penalizes the known input data and unknown input data 245 and then updating the feature extraction means to reduce the robust loss function 250. There are many ways for the method to be receiving of inputs 225, 230, e.g. it could include data from a sensor, from a communication connection, from a data store on some storage medium accessed by a computer or some combination thereof. The feature extraction means 235 and scoring means 240 might be a deep network, a weighted combination of hand-designed features/scores or some combination, and those skilled in the art will see many combinations of input, feature extraction and scoring which are standard parts of classification systems. The most important and novel step for this family of embodiments of the current invention is evaluating the robust loss function 245 with separated losses for known and unknown inputs. Embodiments might use Entropic Open-Set Loss Equation (1), or Equation (2). If using a deep network, both of these have a desired location for the unknowns as the origin in either the space of log its Equation (1), or in some other deep feature layer for Equation (2). In general, these loss function elements would be combined with other loss function elements designed to improve the separation of the known classes of interest. For other embodiments, one might choose different desired locations for the unknowns, which can be appropriate in deep networks with bias parameters or when using hand-designed features. The update to feature extraction 250 would commonly be implemented via some type of gradient decent though those skilled in the art will see other ways such as using so-called genetic or evolutionary algorithms, numeric optimization or even randomized search.

Figure 3:
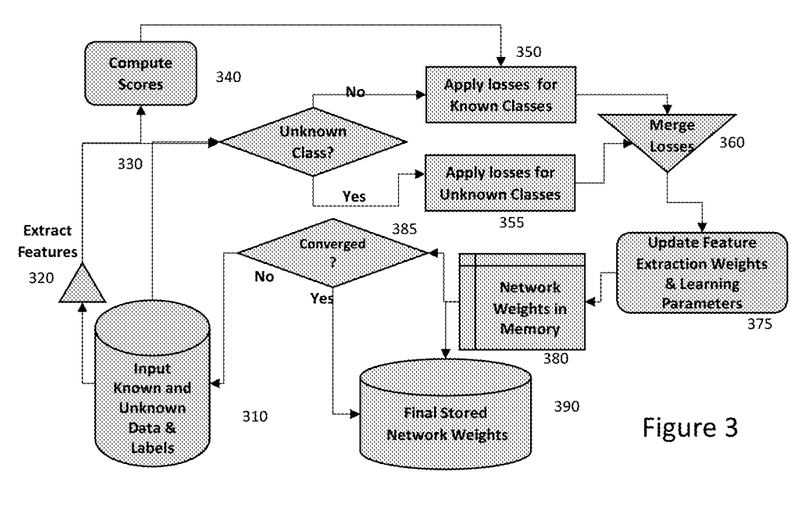
FIG. 3 Overview of a system for learning updated weights for the transformation of input data to provide a robust classifier.

In FIG. 3 we show another preferred embodiment where the known and unknown inputs 310 are transformed by feature extraction 320. The input label being unknown or known determines 330 which type of loss to compute. If the input is known, the loss 350 will also use the per-class score 340 computed from the extracted features. If the input is unknown, the loss 355 would measure dissimilarity to some desired representation for unknown inputs. The system would merge 360, either directly or over time, the losses from both known and unknown inputs. Using the information from the merged losses, it would compute update to the feature extraction weights and other learning parameters 375 would be used to update such weights in memory. The system would then determine if the learning of the transformation had converged 385, e.g., by examining the size of or rate of change of the updates. If the converged signal is obtained, the system would ideally store the updated transformation network in some a non-transitory computer storage media.

The previous discussion presented embodiments with our novel robust loss functions which help to transform the networking training process to produce a network that provides a far more robust transformation of the input data into deep representations or decisions. While the previous sections were focused explaining the core novelty and reducing the embodiments to practice in isolation, there is a substantial value in combining these ideas with existing inventions to provide improved systems and methods for machine learning that is robust to the unknown items that occur in real systems. This is a space of problems for which there are many related patents and patent applications, but none that provides robustness via increasing entropy on unknown inputs or reducing the magnitude of deep features. The present invention is entirely compatible with a wide range of related inventions such as:

U.S. Pat. No. 7,962,428 issued Jun. 14 2011 to Jinbo Bi and Murat Dundar, entitled "System and method for joint optimization of cascaded classifiers for computer-aided detection."

U.S. Pat. No. 8,234,228 issued Jul. 31 2012 to Jason Weston and Ronan Collobert, entitled "Method for training a learning machine having a deep multi-layered network with labeled and unlabeled training data."

U.S. Pat. No. 9,373,057 issued to Dumitru Erhan, Christian Szegedy, and Dragomir Anguelov, entitled "Training a neural network to detect objects in images."

U.S. Pat. No. 9,792,532 issued Oct. 17 2017 to David Cox, Walter Scheirer, Samuel Anthony, and Ken Nakayama, entitled "Systems and methods for machine learning enhanced by human measurements."

which are focused on the improved handling of "known" training examples or to improve approaches of rejecting negative classes, but none of these improve the feature representation for simultaneous recognition and rejection by having the desired feature representation for unknowns that are effectively between all known classes or with small magnitude. Those skilled in the art will see that the novel loss functions of the current inventions could be added to the loss functions used in the above work to provide robustness to unknowns within the application of those inventions.

While we had present and evaluated a few preferred embodiments of these new inventions, there is a wide range of embodiments that capture the core concept which we briefly review. Those skilled in the art will see how many variations can be applied in keeping with the core elements of the invention: putting the unknowns near all known classes, increasing entropy for known unknowns during training and potentially limiting the magnitude of deep features.

A range of embodiments can be obtained by modifying the training for known classes of interest $x \in \mathcal{D}_c'$. For example, one can extend Equation (1), where one replaces the softmax loss for $x \in \mathcal{D}_c'$, (known as training samples) with any of the many known loss functions, such as L1 Loss, L2 Loss, expectation loss, log loss, hinge-loss, Tanimoto loss, center-loss, powers of loss functions (squared, cubed). Even more novel loss functions, such as those based on human-perception (U.S. Pat. No. 9,792,532 issued Oct. 17 2017 to David Cox, Walter Scheirer, Samuel Anthony, and Ken Nakayama, entitled "Systems and methods for machine learning enhanced by human measurements") could be used. Similarly the loss function for $x \in \mathcal{D}_c$, in Equation (2), could use any added penalty that pushes $\|F(x)\|$ away from zero. Changing the loss function for the knowns does not impact the novelty and usefulness of the proposed invention in handling unknown inputs but, for some problems, might provide increased accuracy for public classes.

In the previous embodiments, the "unknown class" is structured to be at the origin and other classes are pushed away with and having the softmax loss term separating them in the other dimension. One issue to consider with a different loss is where is the desired representation for the unknown inputs. For example, when using a center-loss, it is possible that the classes will not be symmetric about the origin, so a better-desired representation for the unknown inputs would be the average of the class centers. This would ensure the unknowns were near each class. In another embodiment, rather than having known classes just be a minimum distance from the origin (i.e. the unknown class) one could have a target location for each class where each class is at least a minimum distance not only from the origin but also from the nearest other class. One embodiment could do this by extending Equation (2)o with a term that considers the magnitude $\|F(x) - F(x')\|$, where x' is the closest point from another class or the center-point of the closest class. Those skilled in the art will see how to use the core aspects of the unknowns being near each known class and having high entropy, core aspects of the invention, as a guiding principle to select the desired representation to use when combined with any particular loss function on the knowns.

Another class of alternative embodiments can be obtained by modifying the training for known unknown classes $x \in \mathcal{D}_b$ in ways that still enforce high entropy across the unknowns. For example, one can extend Equation (1) by replacing some of the softmax values with any other function that increases entropy across the known classes, e.g., true entropy measure ($\Sigma p_i \log p_i$) or KL divergence from a uniform or a known prior distribution. Another alternative, which follows from the analysis given, would be to have a loss for $x \in \mathcal{D}_b$, which forces small deep feature magnitude $\|F(x)\| \ll 1$ which we have shown to induce high entropy.

While the above described the use of a single $\eta$ parameter as the minimum feature magnitude for "known" classes, and a target of zero for the feature magnitude for unknown classes, all that really matters is forcing them to be separated. In some problems, it is natural to see a more general measure, not just a binary separation, e.g. a face that is very blurry or very small may be clearly a face, but the actual identity of the subject might be unknown. In an embodiment to address such a problem, the system would use multiple different parameters $\eta_1, \eta_2, \ldots \eta_n$, as the target goals for different "confidence" levels, e.g. $\eta_1=100$ for very high confident targets with high resolution, $\eta_2=50$ for targets that had medium quality/resolution, $\eta_3=10$ for very blurry or very noisy targets and $\eta_4=0$ for unknown targets.

Another embodiment would directly use user-supplied confidence measure for each input. In such an embodiment, the final magnitude would an approximate measure for the confidence of the network prediction that the input is from a known class.

While we have described the loss functions at a general level, the important transformation of the network occurs as these type of loss functions are applied during network training. These losses induce a transformation of network weights and embodiments might be applying them to a network training from scratch, to fine-tune all weights from a previously trained network, or by adding one or more layers to an existing network and training only a subset of the weights.

While the above was describing embodiments from the view of deep learning in network architectures, the inventions' concepts can be applied to any classification system with learnable weights, e.g., it could be applied on a classic bag-of-words representation with SIFT features in images or n-grams in text, which are then combined with weighted combinations of bags. In such a system, the system might learn the appropriate weights to keep the unknowns at a location between all the known classes.

Figure 4:
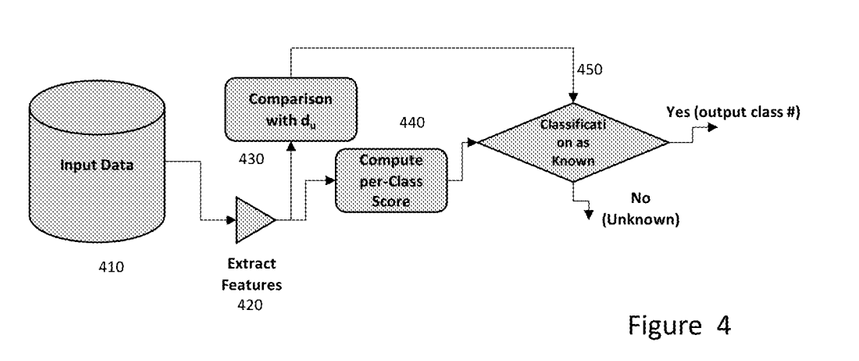
FIG. 4 Overview of a system for transformation of input data to robust classification results where the system uses a desired location $d_u$ for the representation of unknown inputs.
Figure 5:
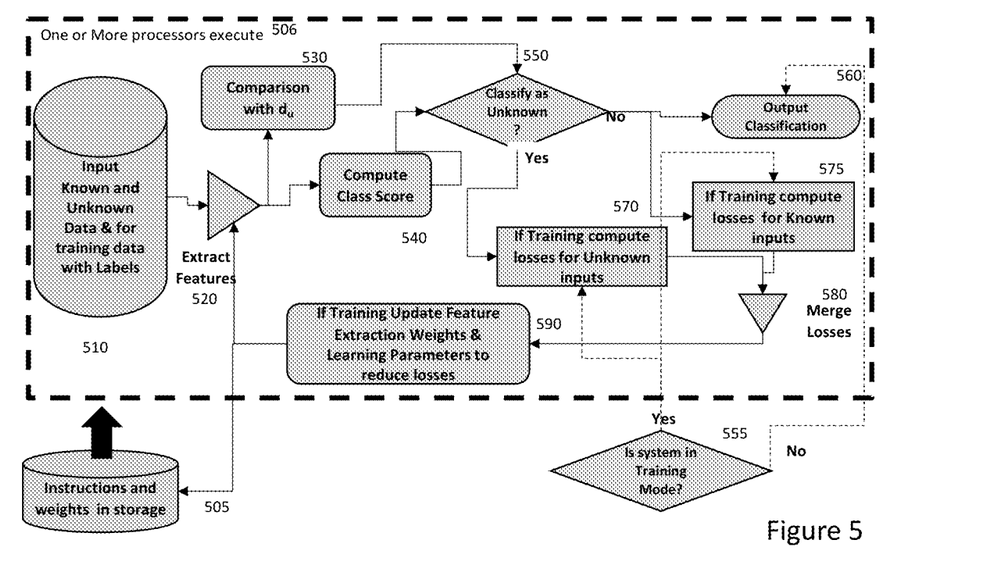
FIG. 5 Overview of a system for transformation of input data to robust classification results where the system uses a desired location $d_u$ for the representation of unknown inputs and uses a robust loss function to update the weights of the model to improve the transform performance.
Figure 6:
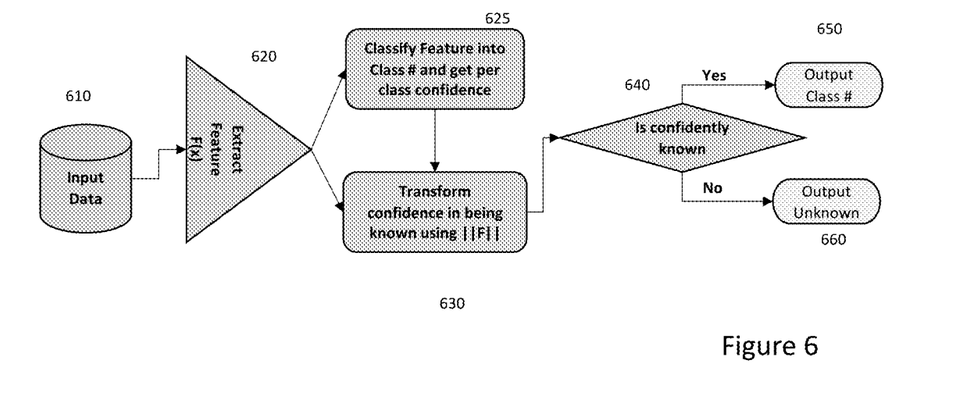
FIG. 6 Overview of a system that uses the norm of the feature representation as part of a confidence that can be thresholded to classify inputs as unknown..

Various embodiments of systems based on the current invention are shown in FIG. 4-FIG. 6.

A minimal system is shown in FIG. 4 for determining if an input 410 is known or unknown by doing feature extraction 420 follow by comparison 430 of the features with the desired representation for unknowns $d_u$ as well as computing a per-class score 440, both of which go into a classification approach that uses dissimilarity to $d_u$ and similarity to known classes. A simple classification could be based on thresholding of dissimilarity or if the scores are reasonably calibrated could be something such as maximum over the class similarity and negative dissimilarity. Those skilled in the art will see a wide range of standard machine-learned classifiers that could be used for the comparison.

A more extensive and adaptive system is shown in FIG. 5. In that system a set of instructions are stored in on a non-transitory computer storage media 505 such that, when desired, those instructions can be fed to computing means where one or more processors 506 will execute the instructions to provide classification and potentially to improve the classifier. For classification the system executes instructions if an input 510 is known or unknown by doing feature extraction 520 follow by comparison 530 of the features with the desired representation for unknowns $d_u$ as well as computing a per-class score 540, both of which go into a classification approach 550 that uses dissimilarity to $d_u$ and similarity to known classes. If the system is not training 555 then it outputs the classification score 560. If the system is training 555, then it computes a loss with different loss computations for unknown inputs 570 and for known inputs 575. The unknown loss could include Equations (1) or (2), or a variation of that attempts to induce small magnitude feature vectors for unknown classes and large magnitude for known classes. In general, for training, multiple inputs can be processed at once as a batch, and the resulting losses can be merged 580 and used to update feature extraction weights and learning parameters 590 so as to reduce the loss and improve system performance. Such updates will often use the gradient of the loss and backpropagates the gradients to change the weights. Standard approaches can be used to determine when the process has converged and to stop the learning iterations, e.g., either a fixed number of iterations, loss convergence or accuracy on a validation set. After convergence, updated weights would be stored in the non-transitory computer storage media 505 which could be flash memory, magnetic disk or optical storage, either locally or over a computer network. Some embodiments could use a batch size of one, which would eliminate the need for a merge after the loss 580. The novel loss function, applied to a labeled mixture of known classes of interest and known unknown/background classes, transforms the network to improve robustness and to produce features extraction means which can be transformed into confidence measures.

One embodiment for system operation during testing is shown in FIG. 6. The processing starts with inputs data 610 x from which the system extracts features F(x) 620. The features are transformed to determine the per class score and confidence 625. Separate transformation is applied using the magnitude of the feature $\|F(x)\|$ to determine the confidence the input is known 630, with the simplest being just to scale per class confidence by the magnitude, but those skilled in the art will realize that many fusion transformations may be effective. These combined confidence measures are processed by comparison means 640 determine if there is sufficient confidence the input is a known class in which case the system outputs one more class labels and potentially confidence in those classes 650 and if there is not sufficient confidence it can output a symbol for "unknown" 660. A simple comparison might be to a fixed threshold by alternative embodiments might not threshold the confidence but rather use it in a fusion function or other system functions where confidence in the decision might be used or displayed to human operators.

In a system, these transformation methods and loss computations, FIG. 4, FIG. 5 and FIG. 6, can be implemented in a system using a wide range of data processing apparatus. The term "data processing apparatus" encompasses all kinds of apparatus, devices, and machines for processing data, including by way of example a programmable processor, a computer, or multiple processors or computers, or massively parallel graphics processing units (GPUs). The apparatus can include special purpose logic circuitry, e.g., an FPGA (field programmable gate array) or an ASIC (application specific integrated circuit) or other types of specialized accelerated machine learning hardware. The apparatus can also include, in addition to hardware, code that creates an execution environment for the computer program in question, e.g., code that constitutes processor firmware, a protocol stack, a database management system, an operating system, or a combination of one or more of them.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall between.

What is claimed:

1. A method for transforming input data into robust classification results, wherein the transforming includes:
   a) transforming an input x through a parameterized feature extraction process to produce a feature representation F(x;P);
   b) a step where a scoring process is applied to the parameterized feature representation to determine a classification score $S_c(F(x,P))$ for class label c;
   c) a step for robust classification, which maps Sc(F(x,P)) to a set of class labels associated with input x wherein the transforming includes at least one of computing a maximum over a set of classification scores or thresholding classification scores;
   d) wherein parameters P are results of a plurality of training processes for transforming the input to improve robust machine classification that includes:
      i. receiving a plurality of known input data for two or more labeled classes of interest;
      ii. receiving a plurality of unknown input data from classes separate from the labeled classes of interest;

iii. adjusting the parameters P to reduce penalty of a robust loss function which includes $\alpha*J_E(x)+\beta*J_R(x)$ where $\alpha\geq 0$, $\beta\geq 0$, and $\alpha+\beta>0$;

iv. wherein x is an input and $w_c$ is a per-class weight for entropy loss $$J_E(x) = \begin{cases} L(S_c(F(x;P))) & \text{if } x \in D'_c, \text{ i.e. } x \text{ is from known class } c \\ \sum_{c=1}^{C} w_c L(S_c(F(x;P)) & \text{if } x \in D'_b, \text{ i.e. } x \text{ is not from a known class} \end{cases}$$

where L is a loss function v. for a desired representation of unknown inputs, $d_u$ representation loss term $J_R(x)$ is such that when for input $x \in D_b'$ reducing $J_R(F(x;P))$ generally decreases dissimilarity $\|F(x;P)-d_u\|$ between the feature representation and the desired representation of unknown, while for $x \in D_c'$ reducing $J_R(F(x;P))$ generally increases the dissimilarity with $d_u$;

vi. using a penalization process to modify the parameters P to reduce the robust loss, wherein penalty reduction is a deterministic or stochastic variant of one of gradient descent, numeric optimization, genetic algorithm, evolutionary algorithms, or randomized search.

2. The method of claim 1 further comprising training and classification steps wherein:

a) The training step for improving the robust loss transforms input data to improve P wherein:

i) $\alpha>0$ ii) the robust loss function $J_E(x)$ includes a term for a known input being incorrectly classified and a structurally distinct, term for an unknown input, and iii) the training step outputs P to an output interface;

b) The classification step loads the externally computed parameters P from an input interface.

3. The method of claim 1, wherein the robust loss function has $\alpha>0$ and computes $J_E(x)$ as:

$$J_E(x) = \begin{cases} -\log(S_c(F(x;P))) & \text{if } x \in D_c', \text{ i.e., the input is from known class } c \\ -\frac{1}{C}\sum_{c=1}^{C} \log(S_c(F(x;P))) & \text{if } x \in D_b', \text{ i.e., the input is not from a known class} \end{cases}$$

4. The method of claim 3, wherein the classification score includes a softmax score $$S_c(F(x;P)) = \frac{e^{l_c(F(x;P))}}{\sum_{c'} e^{l_{c'}(F(x;P))}},$$

where $l_c(F(x;P))$ represents a logit value for class c given input x.

5. The method of claim 1 comprising:

a) training, computing parameter P to optimize its losses wherein i) $\beta>0$;

ii) The robust loss function includes a term in $J_E(x)$ for an unknown input's feature representation being dissimilar from $d_u$;

iii) The robust loss function includes a term in $J_E(x)$ for a known input's feature representation being too similar to $d_u$;

b) wherein the training step outputs the resulting P to a storage medium;

c) wherein before classification, the transforming process of claim 1 loads the parameters P from the storage medium or an alternative medium with a copy of P.

6. The method of claim 1 wherein the robust loss function $J_R(x)$ includes:

$$J_R(x) = \begin{cases} \max(\xi - \|F(x;P) - d_u\|, 0)^2 & \text{if } x \text{ is from known class } c \\ \|F(x;P) - d_u\|^2 & \text{if } x \text{ is not from a known class} \end{cases}$$

where x in the input, $F(x;P)$ is the feature representation for input x, $d_u$ is a desired location of unknowns, $\|F(x;P)-d_u\|$ is a dissimilarity measure, $\xi$ and represents a minimum distance of known inputs from the desired location of the unknowns.

7. A system comprising at least one computing device with at least one processor, memory, and wherein said device performs classification that is robust to unknown inputs, including:

a. an interface for receiving input data;

b. a desired feature representation for unknown inputs, $d_u$;

c. a parameterized feature extraction process that transforms each input x to produce the feature representation $F(x;P)$ wherein said parameterized feature extraction process is configured to map unknown inputs to feature locations near $d_u$;

d. computing a robust classification transformation process that computes a function of the feature representation to determine whether input x is derived from a known class while the classification process remains robust to inputs from unknown classes;

e) wherein parameters P are results of a training process for improving robust machine classification that includes:

i. receiving a plurality of known input data for two or more labeled classes of interest.

ii. receiving a plurality of unknown input data from classes separate from the labeled classes of interest.

iii. adjusting the parameters P to reduce penalty of a robust loss function which includes at least one of an entropy loss $J_E(x)$ or desired representation loss $J_R(x)$;

iv. wherein input x, given per-class weights $w_c$, entropy loss combines per-class losses L according to $$J_E(x) = \begin{cases} L(S_c(F(x;P))) & \text{if } x \in D_c', \text{ i.e. } x \text{ is from known class } c \\ \sum_{c=1}^{C} w_c L(S_c(F(x;P)) & \text{if } x \in D_b', \text{ i.e. } x \text{ is not from a known class} \end{cases}$$

wherein for a desired representation of unknown inputs, $d_u$ the desired representation loss term $J_R(x)$ is such that for input $x \in D_b'$ reducing $J_R(F(x; P))$ generally decreases dissimilarity $\|F(x; P) - d_u\|$ between the feature representation and the desired representation of unknown, while for $x \in D_c'$ reducing $J_R(F(x; P))$ generally increases the dissimilarity with $d_u$;

v. using a penalization process to modify the parameters P to reduce the robust loss, wherein the penalty reduction is deterministic or stochastic variants of one of gradient descent, numeric optimization, genetic algorithms, evolutionary algorithms, or randomized search.

8. The system of claim 7 wherein
a. the robust classification transformation includes computing a softmax score $$S_c(F(x; P)) = \frac{e^{l_c(F(x;P))}}{\sum_j e^{l_j(F(x;P))}},$$

where $l_c(F(x; P))$ represents a logit value for class c given input x;
b. a desired location for the representation of unknown inputs is the origin.

9. The system of claim 7 wherein each known classes $c \in \{1, \ldots, C\}$ has a desired feature representation $d_c$, and the classification uses similarity to $d_c$ and dissimilarity to $d_u$.

10. The system of claim 7 wherein
a) wherein the robust classification transformation process of claim 7 retrieves the parameters P via an input interface;
b) using a training process to compute the parameters P of the parameterized input transformation process, the training process including:
  i) receiving either known input data from a labeled class of interest or an unknown input data from a class other than labeled classes of interest;
  ii) evaluating the robust loss function that computes at least one of an entropy loss $J_E(x)$ or desired representation loss $J_R(x)$;
  iii) updating the parameters P of feature extraction means to reduce the robust loss;
  iv) outputting the resulting P to a storage medium.

11. The system of claim 7 wherein the robust loss function includes a term:

$$J_E(x) = \begin{cases} -\log(S_c(x)) & \text{if } x \text{ is from known class } c \\ -\frac{1}{C}\sum_{c=1}^{C} \log(S_c(x)) & \text{if } x \text{ is not from a known class} \end{cases}$$

where x is the input, and given known classes $c \in \{1, \ldots, C\}$ $S_c(X)$ is the classification score for class c.

12. The system of claim 7 wherein
a) the robust loss function includes $d_u$, a desired location of unknown inputs in representation space;
b) the robust loss function includes a dissimilarity term for computing an unknown input's feature representation being too far from the desired location $d_u$;
c) the robust loss function includes a term computing a known input's feature representation being too close to $d_u$;

d) where reducing the robust loss seeks to decrease a measure of dissimilarity of the representation for unknown input x, while for known input, it attempts to increase the dissimilarity.

13. The system of claim 12 wherein the robust loss function includes the following:

$$J_R(x) = \begin{cases} \max(\xi - \|F((x; P) - d_u)\|, 0)^2 & \text{if } x \text{ is from known class } c \\ \|F(x; P) - d_u\|^2 & \text{if } x \text{ is not from a known class} \end{cases}$$

where x, is the input, $F(x; P) - d_u$ is the feature representation, input x, $d_u$ is the desired location of unknowns in the space of the feature representation, $\|F(x; P) - d_u\|$ is a dissimilarity measure and $\xi$ represents a minimum dissimilarity of known inputs from the desired location of the unknowns.

14. The system of claim 12 wherein the magnitude of dissimilarity $\|F(x; P) - d_u\|$ estimates confidence of classification which is obtained by having the robust loss function include the following:

$$J_R(x) = \begin{cases} \max(\xi + C(x) - \|F((x; P) - d_u)\|, 0)^2 & \text{if } x \text{ is from known class } c \\ \|F(x; P) - d_u\|^2 & \text{if } x \text{ is not from a known class} \end{cases}$$

where x in the input, $F(x; P) - d_u$ is the feature representation, input x, $d_u$ is the desired location of unknowns in the space of the feature representation, $\|F(x; P) - d_u\|$ is a dissimilarity measure on a space of feature representations, and $\xi$ represents a minimum dissimilarity of known inputs from the desired location of the unknowns and $C(x)$ is a confidence of input x.

15. A non-transitory computer storage media storing computer-usable instructions for classification that has improved robustness to unknown inputs that includes
a) receiving input data x;
b) instructions for a parameterized feature transformation process, with parameters P, that transform the input x into at least one feature representation $F(x;P)$, wherein the parameters P are the results of a training process for improving robust machine classification that includes the steps of:
  i. receiving a plurality of known input data for two or more labeled classes of interest.
  ii. receiving a plurality of unknown input data from classes separate from the labeled classes of interest.
  iii. adjusting the parameters P to reduce penalty of a robust loss function which includes at least one of an entropy loss $J_E(x)$ or desired representation loss $J_R(x)$;
  iv. wherein input x, given per-class weights $w_c$, reducing entropy loss effectively reduces per-class losses L according to $$J_E(x) = \begin{cases} L(S_c(F(x; P))) & \text{if } x \in D_c', \text{i.e.} x \text{ is from known class } c \\ \sum_{c=1}^{C} w_c L(S_c(F(x; P))) & \text{if } x \in D_b', \text{i.e.} x \text{ is not from a known class} \end{cases}$$

v. wherein for a desired representation of unknown inputs, $d_u$ the desired representation loss term $J_R(x)$ is such that for input $x \in D_b'$ reducing $J_R(F(x; P))$ generally decreases dissimilarity between the feature representation and the desired representation of unknown inputs, while for $x \in D_c'$ reducing $J_R(F(x; P))$ generally increases the dissimilarity with $d_u$;

vi. using a penalization process to modify the parameters P to effectively reduce the robust loss function, wherein the penalty reduction approximates a deterministic or stochastic variant of one of gradient descent, numeric optimization, genetic algorithms, evolutionary algorithms, or randomized search.

c) transforming the feature representation of the input to produce a classification score $S_c(F(x,P))$ for at least one known class c;

d) computing at least one dissimilarity measure that measures either distance between points in feature space or distances between a point and a classification boundary;

e) a classification transformation that approximately computes either a maximum over a set of classification scores or thresholds of classification scores.

16. The non-transitory computer storage of claim 15 wherein each known classes $C \in \{1, \ldots, C\}$ has a desired feature representation $d_c$, and the classification uses similarity to $d_c$, and dissimilarity to $d_u$.

17. The non-transitory computer storage of claim 15 wherein the system loads parameters P from an input interface where a separate processing system computes P and includes the step of:

a) communicating the resulting P to an output interface.

18. The non-transitory computer storage of claim 15 wherein the robust loss function includes a term:

$$J_E(x) = \begin{cases} -\log(S_c(x)) & \text{if } x \text{ is from known class } c \\ -\sum_{c=1}^{C} w_c \log(S_c(x)) & \text{if } x \text{ is not from a known class} \end{cases}$$

where x is input, $w_c$, is a per class weight and given known classes $c \in \{1, \ldots, C, S_c(X)$ a classification score for class c.

19. The non-transitory computer storage of claim 15 wherein a) The robust loss function includes the following:

$$J_R(x) = \begin{cases} \max(\xi + C(x) - \|F((x; P) - d_u)\|, 0)^2 & \text{if } x \text{ is from known class } c \\ \|F(x; P) - d_u\|^2 & \text{if } x \text{ is not from a known class} \end{cases}$$

where x is the input, F(x; P) is the feature representation of input x, $d_u$ is a desired location of unknowns in the space of the feature representation, $\|F(x; P) - d_u\|$ is a dissimilarity measure between F(x; P) and $d_u$, $\xi$ represents a desired minimum dissimilarity of known inputs from the desired location of the unknowns, and C(x) is the training confidence measure for input x;

b) wherein $\|F(x; P) - d_u\|$ estimates confidence that the input is from a known class.

* * * * *